United States Patent
Gomadam et al.

(10) Patent No.: US 9,048,970 B1
(45) Date of Patent: Jun. 2, 2015

(54) FEEDBACK FOR COOPERATIVE MULTIPOINT TRANSMISSION SYSTEMS

(75) Inventors: Krishna Srikanth Gomadam, Santa Clara, CA (US); Adoram Erell, Herzliya (IL)

(73) Assignee: MARVELL INTERNATIONAL LTD., Hamilton (BM)

( * ) Notice: Subject to any disclaimer, the term of this patent is extended or adjusted under 35 U.S.C. 154(b) by 792 days.

(21) Appl. No.: 13/346,737

(22) Filed: Jan. 10, 2012

Related U.S. Application Data (60) Provisional application No. 61/432,980, filed on Jan. 14, 2011, provisional application No. 61/559,896, filed on Nov. 15, 2011.

(51) Int. Cl.
  H04B 7/00 (2006.01)
  H04B 7/15 (2006.01)
  H04J 11/00 (2006.01)
  H04B 7/04 (2006.01)

(52) U.S. Cl.
  CPC .......... H04J 11/0033 (2013.01); H04B 7/0417 (2013.01)

(58) Field of Classification Search
  CPC . H04W 52/243; H04W 52/241; H04W 24/02; H04W 52/225; H04W 52/24; H04W 72/08; H04W 72/082; H04W 24/08; H04W 72/085; H04W 24/10; H04W 72/042; H04W 24/00; H04W 28/0236; H04W 36/30; H04W 36/36; H04W 52/244; H04W 72/1226; H04B 7/0617; H04B 17/0077; H04B 7/0417; H04B 7/0456; H04B 7/0632; H04B 7/0452; H04B 7/0413; H04B 7/0626; H04J 11/0033; H04J 11/0053
  USPC .......... 455/500, 69, 126, 67.11, 114.2, 278.1, 455/524, 296, 24, 67.13, 423; 370/329, 370/252, 331, 335; 375/267, 346, 299, 285
  See application file for complete search history.

(56) References Cited

U.S. PATENT DOCUMENTS 5,231,629 A 7/1993 Kotzin et al.
5,263,160 A 11/1993 Porter, Jr. et al.
(Continued)

FOREIGN PATENT DOCUMENTS

EP 2182754 A1 5/2010
JP 2008236222 A 2/2008
(Continued)

OTHER PUBLICATIONS

International Application No. PCT/IB2009/052726 Search Report dated Jan. 28, 2010.
(Continued)

*Primary Examiner* — Sujatha Sharma (57) ABSTRACT

A method in a mobile communication terminal includes receiving signals from a serving cell and from one or more interfering cells. Respective channel responses are estimated in the terminal for the signals received from the interfering cells. A level of interference, caused by the signals of the interfering cells to a signal received from the serving cell, is derived from the channel responses. A Signal to Noise Ratio (SNR) is calculated for the signal received from the serving cell based on the level of interference caused by the signals of the interfering cells. Feedback information is produced based on the SNR and transmitted from the terminal.

17 Claims, 2 Drawing Sheets

(56) References Cited

U.S. PATENT DOCUMENTS

| | | |
|---|---|---|
| 5,349,567 A | 9/1994 | Reed |
| 5,940,439 A | 8/1999 | Kleider et al. |
| 6,466,904 B1 | 10/2002 | Gao et al. |
| 6,512,750 B1 | 1/2003 | Palenius |
| 6,757,319 B1 | 6/2004 | Parsa et al. |
| 6,865,237 B1 | 3/2005 | Boariu et al. |
| 7,839,944 B2 | 11/2010 | Lee et al. |
| 7,941,186 B2 | 5/2011 | Cho et al. |
| 8,036,286 B2 | 10/2011 | Lee et al. |
| 8,068,555 B2 | 11/2011 | Jongren et al. |
| 8,098,750 B2 | 1/2012 | Mueck et al. |
| 8,179,775 B2 | 5/2012 | Chen et al. |
| 8,325,844 B2 | 12/2012 | Walton et al. |
| 8,515,435 B2 | 8/2013 | Krasny et al. |
| 8,559,879 B2 | 10/2013 | Bhushan et al. |
| 8,565,808 B2 | 10/2013 | Hosono et al. |
| 8,694,017 B2 * | 4/2014 | Bhushan ............ 455/452.2 |
| 2002/0001333 A1 | 1/2002 | Glasheen et al. |
| 2003/0035491 A1 | 2/2003 | Walton et al. |
| 2005/0108281 A1 | 5/2005 | Kim et al. |
| 2005/0141630 A1 | 6/2005 | Catreaux et al. |
| 2005/0157810 A1 | 7/2005 | Raleigh et al. |
| 2005/0237920 A1 | 10/2005 | Howard et al. |
| 2005/0250544 A1 | 11/2005 | Grant et al. |
| 2005/0276317 A1 | 12/2005 | Jeong et al. |
| 2006/0014554 A1 | 1/2006 | Gerlach |
| 2006/0056538 A1 | 3/2006 | Nam et al. |
| 2006/0093060 A1 | 5/2006 | Jung et al. |
| 2006/0114858 A1 | 6/2006 | Walton et al. |
| 2006/0153112 A1 | 7/2006 | Lim et al. |
| 2006/0203777 A1 | 9/2006 | Kim et al. |
| 2006/0233131 A1 | 10/2006 | Gore et al. |
| 2006/0276212 A1 | 12/2006 | Sampath et al. |
| 2007/0058746 A1 | 3/2007 | Gueguen |
| 2007/0076810 A1 | 4/2007 | Herrera et al. |
| 2007/0099578 A1 | 5/2007 | Adeney et al. |
| 2007/0149229 A1 | 6/2007 | Frederiksen et al. |
| 2007/0153731 A1 | 7/2007 | Fine |
| 2007/0160162 A1 | 7/2007 | Kim et al. |
| 2007/0165738 A1 | 7/2007 | Barriac et al. |
| 2007/0201407 A1 * | 8/2007 | Borran et al. ............ 370/335 |
| 2007/0217540 A1 | 9/2007 | Onggosanusi et al. |
| 2007/0223422 A1 | 9/2007 | Kim et al. |
| 2007/0223423 A1 | 9/2007 | Kim et al. |
| 2007/0230373 A1 | 10/2007 | Li et al. |
| 2007/0248068 A1 | 10/2007 | Onggosanusi et al. |
| 2007/0253386 A1 | 11/2007 | Li et al. |
| 2007/0270170 A1 | 11/2007 | Yoon et al. |
| 2008/0013610 A1 | 1/2008 | Varadarajan et al. |
| 2008/0025336 A1 | 1/2008 | Cho et al. |
| 2008/0039067 A1 | 2/2008 | Jin et al. |
| 2008/0043702 A1 | 2/2008 | Moon et al. |
| 2008/0049709 A1 | 2/2008 | Pan et al. |
| 2008/0080364 A1 | 4/2008 | Barak et al. |
| 2008/0080632 A1 | 4/2008 | Kim et al. |
| 2008/0080634 A1 | 4/2008 | Kotecha et al. |
| 2008/0080635 A1 | 4/2008 | Hugl et al. |
| 2008/0080637 A1 | 4/2008 | Khan et al. |
| 2008/0095258 A1 | 4/2008 | She et al. |
| 2008/0101407 A1 | 5/2008 | Khan et al. |
| 2008/0108310 A1 | 5/2008 | Tong et al. |
| 2008/0112351 A1 | 5/2008 | Surineni et al. |
| 2008/0130778 A1 | 6/2008 | Xia et al. |
| 2008/0144522 A1 | 6/2008 | Chang et al. |
| 2008/0165875 A1 | 7/2008 | Mundarath et al. |
| 2008/0186212 A1 | 8/2008 | Clerckx et al. |
| 2008/0192852 A1 | 8/2008 | Kent et al. |
| 2008/0198776 A1 | 8/2008 | Seo |
| 2008/0232494 A1 | 9/2008 | Pan et al. |
| 2008/0232503 A1 | 9/2008 | Kim |
| 2008/0247364 A1 | 10/2008 | Kim et al. |
| 2008/0247475 A1 | 10/2008 | Kim et al. |
| 2008/0268855 A1 | 10/2008 | Hanuni et al. |
| 2008/0268887 A1 | 10/2008 | Jansen et al. |
| 2008/0285433 A1 | 11/2008 | Akita et al. |
| 2008/0292013 A1 | 11/2008 | Varadarajan et al. |
| 2008/0298452 A1 | 12/2008 | Sampath et al. |
| 2008/0298482 A1 | 12/2008 | Rensburg et al. |
| 2008/0318606 A1 | 12/2008 | Tsutsui et al. |
| 2009/0011761 A1 | 1/2009 | Han et al. |
| 2009/0016263 A1 | 1/2009 | Kishigami et al. |
| 2009/0046800 A1 | 2/2009 | Xu et al. |
| 2009/0098876 A1 | 4/2009 | Khan et al. |
| 2009/0110114 A1 | 4/2009 | Onggosanusi et al. |
| 2009/0122857 A1 | 5/2009 | Li et al. |
| 2009/0161605 A1 | 6/2009 | Shen et al. |
| 2009/0180561 A1 | 7/2009 | Kim et al. |
| 2009/0245195 A1 * | 10/2009 | Bhattad et al. ............ 370/329 |
| 2009/0247084 A1 * | 10/2009 | Palanki ............ 455/63.1 |
| 2009/0252332 A1 | 10/2009 | Chang et al. |
| 2009/0252333 A1 | 10/2009 | Chang et al. |
| 2009/0282310 A1 | 11/2009 | Seok et al. |
| 2009/0296844 A1 | 12/2009 | Ihm et al. |
| 2009/0304109 A1 | 12/2009 | Kotecha |
| 2010/0009634 A1 * | 1/2010 | Budianu et al. ............ 455/63.1 |
| 2010/0031117 A1 | 2/2010 | Lee et al. |
| 2010/0034308 A1 | 2/2010 | Kim et al. |
| 2010/0035627 A1 | 2/2010 | Hou et al. |
| 2010/0054354 A1 | 3/2010 | Tosato |
| 2010/0056170 A1 | 3/2010 | Lindoff et al. |
| 2010/0061477 A1 | 3/2010 | Lee et al. |
| 2010/0067512 A1 | 3/2010 | Nam et al. |
| 2010/0069106 A1 | 3/2010 | Swarts et al. |
| 2010/0074301 A1 | 3/2010 | Howard et al. |
| 2010/0103834 A1 | 4/2010 | Gorokhov et al. |
| 2010/0113078 A1 | 5/2010 | Farajidana et al. |
| 2010/0158151 A1 | 6/2010 | Krauss et al. |
| 2010/0172424 A1 | 7/2010 | Perets et al. |
| 2010/0172430 A1 | 7/2010 | Melzer et al. |
| 2010/0173639 A1 | 7/2010 | Li et al. |
| 2010/0215112 A1 | 8/2010 | Tsai et al. |
| 2010/0220800 A1 | 9/2010 | Erell et al. |
| 2010/0238984 A1 | 9/2010 | Sayana et al. |
| 2010/0254474 A1 | 10/2010 | Gomadam et al. |
| 2010/0260234 A1 | 10/2010 | Thomas et al. |
| 2010/0260243 A1 | 10/2010 | Ihm et al. |
| 2010/0267341 A1 | 10/2010 | Bergel et al. |
| 2010/0271968 A1 | 10/2010 | Liu et al. |
| 2010/0272014 A1 | 10/2010 | Orlik et al. |
| 2010/0272032 A1 | 10/2010 | Sayana et al. |
| 2010/0273495 A1 | 10/2010 | Onggosanusi et al. |
| 2010/0273514 A1 | 10/2010 | Koo et al. |
| 2010/0278278 A1 | 11/2010 | Lee et al. |
| 2010/0284484 A1 | 11/2010 | Jongren et al. |
| 2010/0290548 A1 | 11/2010 | Hoshno et al. |
| 2010/0296603 A1 | 11/2010 | Lee et al. |
| 2010/0309861 A1 * | 12/2010 | Gorokhov et al. ............ 370/329 |
| 2011/0013710 A1 | 1/2011 | Xiao |
| 2011/0019631 A1 | 1/2011 | Kotecha et al. |
| 2011/0026413 A1 | 2/2011 | Swarts et al. |
| 2011/0034175 A1 | 2/2011 | Fong et al. |
| 2011/0034192 A1 * | 2/2011 | Lim et al. ............ 455/501 |
| 2011/0044193 A1 | 2/2011 | Forenza et al. |
| 2011/0058621 A1 | 3/2011 | Clerckx et al. |
| 2011/0064156 A1 | 3/2011 | Kim et al. |
| 2011/0077038 A1 | 3/2011 | Montojo et al. |
| 2011/0080969 A1 | 4/2011 | Jongren et al. |
| 2011/0085610 A1 | 4/2011 | Zhuang et al. |
| 2011/0086663 A1 * | 4/2011 | Gorokhov et al. ............ 455/522 |
| 2011/0096704 A1 | 4/2011 | Erell et al. |
| 2011/0103534 A1 | 5/2011 | Axmon et al. |
| 2011/0110403 A1 | 5/2011 | Jongren |
| 2011/0110450 A1 | 5/2011 | Gomadam et al. |
| 2011/0134774 A1 | 6/2011 | Pelletier et al. |
| 2011/0150052 A1 | 6/2011 | Erell et al. |
| 2011/0158190 A1 | 6/2011 | Kuwahara et al. |
| 2011/0164701 A1 | 7/2011 | Nikopourdeilami et al. |
| 2011/0170435 A1 | 7/2011 | Kim et al. |
| 2011/0170638 A1 | 7/2011 | Yuan et al. |
| 2011/0176439 A1 | 7/2011 | Mondal et al. |
| 2011/0188393 A1 | 8/2011 | Mallik et al. |
| 2011/0194594 A1 | 8/2011 | Noh et al. |
| 2011/0194638 A1 | 8/2011 | Erell et al. |
| 2011/0194644 A1 | 8/2011 | Liu et al. |

(56) References Cited

U.S. PATENT DOCUMENTS

| | | |
|---|---|---|
| 2011/0199986 A1 | 8/2011 | Fong et al. |
| 2011/0205930 A1 | 8/2011 | Rahman et al. |
| 2011/0216846 A1 | 9/2011 | Lee et al. |
| 2011/0235608 A1 | 9/2011 | Koo et al. |
| 2011/0250919 A1 | 10/2011 | Barbieri et al. |
| 2011/0261775 A1 | 10/2011 | Kim et al. |
| 2011/0268204 A1 | 11/2011 | Choi et al. |
| 2011/0274188 A1 | 11/2011 | Sayana et al. |
| 2011/0306341 A1 | 12/2011 | Klein et al. |
| 2012/0002568 A1 | 1/2012 | Tiirola et al. |
| 2012/0002743 A1 | 1/2012 | Cavalcante et al. |
| 2012/0003926 A1 | 1/2012 | Coldrey et al. |
| 2012/0008556 A1 | 1/2012 | Noh et al. |
| 2012/0020433 A1 | 1/2012 | Bhattad et al. |
| 2012/0028628 A1 | 2/2012 | Frenger et al. |
| 2012/0033592 A1 | 2/2012 | Kim et al. |
| 2012/0033630 A1 | 2/2012 | Chung et al. |
| 2012/0034927 A1 | 2/2012 | Papasakellariou et al. |
| 2012/0039369 A1 | 2/2012 | Choi et al. |
| 2012/0058735 A1 | 3/2012 | Vermani et al. |
| 2012/0063336 A1 | 3/2012 | Shany et al. |
| 2012/0069887 A1 | 3/2012 | Park et al. |
| 2012/0069917 A1 | 3/2012 | Liu et al. |
| 2012/0076028 A1 | 3/2012 | Ko et al. |
| 2012/0076038 A1 | 3/2012 | Shan et al. |
| 2012/0087425 A1 | 4/2012 | Gomadam et al. |
| 2012/0087435 A1 | 4/2012 | Gomadam et al. |
| 2012/0134434 A1 | 5/2012 | Chen et al. |
| 2012/0188976 A1 | 7/2012 | Kim et al. |
| 2012/0213261 A1 | 8/2012 | Sayana et al. |
| 2012/0219042 A1 | 8/2012 | Onggosanusi et al. |
| 2012/0219083 A1 | 8/2012 | Tong et al. |
| 2012/0257664 A1 | 10/2012 | Yue et al. |
| 2012/0275376 A1 | 11/2012 | Sampath et al. |
| 2012/0275386 A1 | 11/2012 | Frenne et al. |
| 2012/0281620 A1 | 11/2012 | Sampath et al. |
| 2012/0287799 A1 | 11/2012 | Chen et al. |
| 2012/0329502 A1 | 12/2012 | Frederiksen et al. |
| 2013/0028068 A1 | 1/2013 | Park et al. |
| 2013/0028344 A1 | 1/2013 | Chen et al. |
| 2013/0039284 A1 | 2/2013 | Marinier et al. |
| 2013/0051256 A1 | 2/2013 | Ong et al. |
| 2013/0077595 A1 | 3/2013 | Aiba et al. |
| 2013/0083681 A1 | 4/2013 | Ebrahimi Tazeh Mahalleh et al. |
| 2013/0088978 A1* | 4/2013 | Mondal et al. ............... 370/252 |
| 2013/0107916 A1 | 5/2013 | Liu et al. |
| 2013/0114427 A1 | 5/2013 | Maattanen et al. |
| 2013/0114428 A1 | 5/2013 | Koivisto et al. |
| 2013/0114431 A1 | 5/2013 | Koivisto |
| 2013/0128847 A1 | 5/2013 | Wang et al. |
| 2013/0176991 A1 | 7/2013 | Yi |
| 2013/0182786 A1 | 7/2013 | Frenne et al. |
| 2013/0250885 A1 | 9/2013 | Davydov et al. |
| 2013/0272221 A1 | 10/2013 | Hoehne et al. |
| 2014/0029568 A1 | 1/2014 | Wang et al. |
| 2014/0029586 A1 | 1/2014 | Loehr et al. |
| 2014/0051357 A1 | 2/2014 | Steer et al. |

FOREIGN PATENT DOCUMENTS

| | | |
|---|---|---|
| JP | 2008054125 A | 3/2008 |
| JP | 2008118411 A | 5/2008 |
| JP | 2008147792 A | 6/2008 |
| WO | 2005117283 A2 | 12/2005 |
| WO | 2007133564 A3 | 11/2007 |
| WO | 2008009157 A1 | 1/2008 |
| WO | 2008133582 A2 | 11/2008 |
| WO | 2009116471 A1 | 9/2009 |
| WO | 2010013950 A2 | 2/2010 |
| WO | 2011147692 A1 | 12/2011 |

OTHER PUBLICATIONS

International Application No. PCT/IB2010/050014 Search Report dated Jun. 15, 2010.
International Application No. PCT/IB2010/050797 Search Report dated Jul. 15, 2010.
International Application No. PCT/IB2010/051089 Search Report dated Jul. 9, 2010.
Ericsson, "Carrier Aggregation in LTE-Advanced", TSG-RAN WG1 #53bis, Warsaw, Poland, Jun. 30-Jul. 4, 2008.
Viswanath et al., "Opportunistic Beamforming Using Dumb Antennas," IEEE Transactions on Information Theory, vol. 48, No. 6, pp. 1277-1294, Jun. 2002.
Sharif et al., "On the Capacity of MIMO Broadcast Channels with Partial Side Information," IEEE Transactions on Information Theory, vol. 51, No. 2, pp. 506-522, Feb. 2005.
Texas Instruments, "Codebook Design for E-UTRA MIMO Precoding", 3GPP TSG RAN WG1 46bis, Seoul, Korea, Oct. 9-13, 2006.
Samsung, "Codebook based Precoding for 8 Tx Transmission in LTE-A", 3GPP TSG RAN WG1 Meeting #55, Prague, Czech Republic, Nov. 10-14, 2008.
Qualcomm Europe, "Link Analysis for 4×2 and 4×4 Precoder Set Decision", 3GPP TSG-RAN WG1 #48bis, St. Julian's, Malta, Mar. 26-30, 2007.
3GPP TR 25.892 V6.0.0, "3rd Generation Partnership Project; Technical Specification Group Radio Access Network; Feasibility Study for Orthogonal Frequency Division Multiplexing (OFDM) for UTRAN enhancement (Release 6)", Sophia Antipolis, France, Jun. 2004.
Samsung, "CQI reporting for MU-MIMO", 3GPP TSG RAN WG1 Meeting #54, Jeju, Korea, Aug. 18-22, 2008.
Motorola, "Some Results on DL-MIMO Enhancements for LTE-A", TSG-RAN WG1 #55bis, Ljubljana, Slovenia, Jan. 12-16, 2009.
Alcatel-Lucent, ""Best Companion" reporting for improved single-cell MU-MIMO pairing", 3GPP TSG RAN WG1 #56 Meeting, Athens, Greece, Feb. 9-13, 2009.
Nokia Siemens Networks, "LTE-Advanced SU-MIMO UE Transmission in LTE Release 8 Network", 3GPP TSG RAN WG1 Meeting #57, San Francisco, USA, May 4-8, 2009.
3GPP TS 25.214 V8.5.0, 3rd Generation Partnership Project; Technical Specification Group Radio Access Network; Physical Layer Procedures (FDD) (Release 8), Sophia Antipolis, France, Mar. 2009.
IEEE Standard 802.16 for Local and metropolitan area networks, "Part 16: Air Interface for Fixed Broadband Wireless Access Systems", Revision of IEEE Standard 802.16-2001, IEEE Computer Society and IEE Microwave Theory and Techniques Society, USA, Oct. 1, 2004.
NTT Docomo et al., "Prioritized Deployment Scenarios for LTE-Advanced Studies", 3GPP TSG RAN WG4 Meeting #50, Athens, Greece, Feb. 9-13, 2009.
Hanzo et al., "OFDM and MCCDMA for Broadband Multi-User Communications, WLANs and Broadcasting", Wiley-IEEE Press, chapter 14, pp. 485-548, Sep. 19, 2003.
China Mobile et al., "Framework for LTE PDSCH DRS Demodulation Requirements", 3GPP TSG RAN WG4 Meeting #49, Prague, Czech Republic, Nov. 10-14, 2008.
Qualcomm Europe, "Downlink RS Structure in Support of Higher-Order MIMO", 3GPP TSG RAN WG1 Meeting #57, San Francisco, USA, May 4-8, 2009.
"RAN1 Chairman Notes", 3GPP TSG RAN WG1 Meeting #55bis, Ljubljana, Slovenia, Jan. 12-16, 2009.
Marvell Semiconductor, "Number of Codewords for 8×8 SU-MIMO in LTE-A DL", 3GPP TSG RAN WG1 Meeting #55bis, Ljubljana, Slovenia, Jan. 12-16, 2009.
LG Electronics, "Consideration of DL-MIMO in LTE-Advanced", 3GPP TSG RAN WG1 Meeting #55, Prague, Czech Republic, Nov. 10-14, 2008.
3rd Generation Partnership Project; Technical Specification Group Radio Access Network; Further Advancements for E-UTRA Physical Layer Aspects (Release 9), 3GPP TS 36.814 V0.4.1 (Feb. 2009), Sophia Antipolis, France.
ETSI TS 136213, "LTE; Evolved Universal Terrestrial Radio Access (E-UTRA), Physical Layer Procedures", V10.2.0, Jun. 2011.
3rd Generation Partnership Project; Technical Specification Group Radio Access Network; Evolved Universal Terrestrial Radio Access (E-UTRA); Physical Channels and Modulation (Release 8), 3GPP TS 36.211 V8.4.0 (Sep. 2008), Sophia Antipolis, France.

(56) References Cited

OTHER PUBLICATIONS

Alcatel-Lucent, "CQI and CSI Feedback Compression", 3GPP TSG RAN WG1 #54bis, Prague, Czech Republic, Sep. 29-Oct. 3, 2008.
Huawei, "DL MIMO Codebook", 3GPP TSG RAN WG1 Meeting #56bis, Seoul, South Korea, Mar. 23-27, 2009.
Huawei, "Adaptive Codebook Designs for MU-MIMO", 3GPP TSG RAN WG1 Meeting #56bis, Seoul, South Korea, Mar. 23-27, 2009.
Motorola, "On UE Feedback to Support LTE-A MU-MIMO and CoMP Operations", TSG-RAN WG1 #56bis, Seoul, South Korea, Mar. 23-27, 2009.
Huawei, "Adaptive Codebook Designs for DL MIMO", 3GPP TSG RAN WG1 Meeting #57, San Francisco, CA USA, May 3-8, 2009.
Ericsson, "On CSI feedback for ITU Requirement Fulfilling CoMP Schemes", TSG-RAN WG1 #57, San Francisco, USA, May 4-8, 2009.
Motorola, "Spatial Correlation Feedback to Support LTE-A MU-MIMO and CoMP: System Operation and Performance Results", TSG-RAN WG1 #57, San Francisco, USA, May 4-8, 2009.
Xia et al., "Design and Analysis of Transmit—Beamforming based on Limited-Rate Feedback", IEEE Transactions on signal processing (Draft), Minneapolis, MN, Mar. 16, 2005.
Huawei, "The Impact of CA on Mobility in LTE-A", 3GPP TSG RAN WG1 Meeting #56, Athens, Greece, Feb. 9-13, 2009.
U.S. Appl. No. 61/111,475, filed Nov. 5, 2008.
Research in Motion, UK Limited, "Uplink Power Control for Carrier Aggregation", 3GPP TSG RAN WG1 Meeting # 57b, Lon Angeles, USA, Jun. 29-Jul. 3, 2009.
Nokia Siemens Networks, "Pusch Power Control for LTE-Advanced", 3GPP TSG RAN WG1 Meeting # 57bis, Los Angeles, USA, Jun. 29-Jul. 3, 2009.
3rd Generation Partnership Project; Technical Specification Group Radio Access Network; Radio Frequency (RF) System Scenarios (Release 5), 3GPP TR 25.942 V5.3.0, Sophia Antipolis, France, Jun. 2004.
Nokia Siemens Networks, "Autonomous Component Carrier Selection for LTE Advanced", 3GPP TSG RAN WG1 Meeting #54, Jeju Island, Korea, Aug. 18-22, 2008.
Nokia Siemens Networks, "Algorithms and Results for Autonomous Component Carrier Selection for LTE-Advanced", 3GPP TSG RAN WG1 Meeting #55, Prague, Czech Republic, Nov. 10-14, 2008.
Nokia Siemens Networks, "Use of Background Interference Matrix for Autonomous Component Carrier Selection for LTE-Advanced", 3GPP TSG RAN WG1 Meeting #55-bis, Ljubljana, Slovenia, Jan. 12-16, 2009.
Qualcomm Europe, Notion of Anchor Carrier in LTE-A, 3GPP TSG RAN WG1 Meeting #55-bis, Ljubljana, Slovenia, Jan. 12-16, 2009.
Samsung, "UL Transmission Power Control in LTE-A", 3GPP TSG RAN WG1 Meeting #56bis, Seoul, Korea, Mar. 23-27, 2009.
International Application PCT/IB2010/055763 Search Report dated Jun. 14, 2011.
International Application PCT/IB2011/050015 Search Report dated Jul. 5, 2011.
Marvell, "Downlink MIMO with Coordinated Beamforming and Scheduling", 3GPP TSG RAN WG1 59, Jeju, South Korea, Nov. 9-14, 2009.
Texas Instruments, "Views and Simulation Results on 4Tx Codebook Enhancement", 3GPP TSG RAN WG1 62, Madrid, Spain, Aug. 23-27, 2010.
Texas Instruments, "Higher CSI feedback accuracy for 4/8Tx Rel.10 DL MIMO", 3GPP TSG RAN WG1 62, Madrid, Spain, Aug. 23-27, 2010.
U.S. Appl. No. 61/568,588, filed Dec. 8, 2011.
U.S. Appl. No. 13/610,904 Office Action dated May 1, 2014.
U.S. Appl. No. 13/433,293 Office Action dated Jun. 24, 2014.
U.S. Appl. No. 12/477,152 Official Action dated Jun. 26, 2012.
U.S. Appl. No. 12/723,645 Official Action dated Aug. 31, 2012.
U.S. Appl. No. 12/723,647 Official Action dated Aug. 17, 2012.
U.S. Appl. No. 12/652,044 Official Action dated Jun. 29, 2012.
U.S. Appl. No. 12/838,509 Official Action dated Jun. 21, 2012.
U.S. Appl. No. 13/023,555 Official Action dated Sep. 14, 2012.

International Application PCT/IB2012/051511 Search Report dated Aug. 31, 2012.
U.S. Appl. No. 13/610,904, filed Sep. 12, 2012.
3GPP TR 36.819 "3rd Generation Partnership Project; Technical Specification Group Radio Access Network; Coordinated Multi-Point Operation for LTE Physical Layer Aspects (release 11)", version 11.0.0, Sep. 2011.
U.S. Appl. No. 61/558,405, filed Nov. 10, 2011.
U.S. Appl. No. 61/556,752, filed Nov. 7, 2011.
U.S. Appl. No. 61/585,556, filed Jan. 11, 2012.
U.S. Appl. No. 12/902,168 Office Action dated Aug. 5, 2013.
U.S. Appl. No. 12/983,898 Office Action dated Sep. 12, 2013.
U.S. Appl. No. 13/052,075 Office Action dated Jul. 15, 2013.
U.S. Appl. No. 13/766,790 Office Action dated Jul. 22, 2013.
U.S. Appl. No. 12/903,237 Office Action dated Aug. 16, 2013.
International Application PCT/IB2013/052963 Search Report dated Sep. 27, 2013.
3rd Generation Partnership Project; Technical Specification Group Radio Access Network; Requirements for Further Advancements for Evolved Universal Terrestrial Radio Access (E-UTRA) (LTE-Advanced) (Release 8), 3GPP TR 36.913 V8.0.1, Sophia Antipolis, France, Mar. 2009.
Motorola, "Uplink Power Control for E-UTRA", 3GPP TSG RAN1 #48, St. Louis, USA, Feb. 12-16, 2007.
Nortel, "On the discussions of carrier aggregations", 3GPP TSG-RAN Working Group 1 Meeting #55, Prague, Czech Republic, Nov. 10-14, 2008.
NTT Docomo, Inc., "Updated Views on Support of Wider Bandwidth in LTE-Advanced", 3GPP TSG RAN WG1 Meeting #54bis, Prague, Czech Republic, Sep. 29-Oct. 3, 2008.
3rd Generation Partnership Project; Technical Specification Group Radio Access Network; User Equipment (UE) radio transmission and reception (FDD) (Release 8), 3GPP TS 25.101 V8.5.1, Sophia Antipolis, France, Jan. 2009.
Lucent Technologies, "Link Error Prediction for E-DCH", TSG-RAN WG1#35, Lisbon, Portugal, Nov. 17-21, 2003.
Ericsson, "On Channel Reciprocity for Enhanced DL Multi-Antenna Transmission", TSG RAN WG1 #59, Jeju, Korea, Nov. 9-13, 2009.
Ericsson, "System-level evaluation of OFDM—further considerations", TSG-RAN WG1 #35, Lisbon, Portugal, Nov. 17-21, 2003.
Nortel Networks, "OFDM Exponential Effective SIR Mapping Validation, EESM Simulation Results for System-Level Performance Evaluations, and Text Proposal for Section A.4.5 of TR 25.892", 3GPP TSG-RAN-1/TSG-RAN-4 Ad Hoc, Espoo, Finland, Jan. 27-30, 2004.
Park et al., "Efficient Coherent Neighbour Cell Search for Synchronous 3GPP LTE System", Electronic Letters, vol. 44, No. 21, Oct. 2008.
Motorola, "Low-Overhead Feedback of Spatial Covariance Matrix", TSG-RAN WG1 #59, Jeju, Korea, Nov. 9-13, 2009.
Motorola, "Use of UL Covariance for Downlink MIMO in FDD", TSG-RAN WG1 #59, Jeju, Korea, Nov. 9-13, 2009.
3rd Generation Partnership Project, "Technical Specification Group Radio Access Network; Evolved Universal Terrestrial Radio Access (E-UTRA); Multiplexing and channel coding (Release 8)", 3GPP TS 36.212 V8.6.0 (Mar. 2009), Sophia Antipolis, France.
Samsung, "Discussion on Enhanced DL Beamforming", 3GPP TSG RAN WG1 Meeting #56bis, Seoul, Korea, Mar. 23-27, 2009.
Alcatel-Lucent Shanghai Bell, "Correlation-based Explicit Feedback", 3GPP TSG RAN WG1 Meeting # 59bis, Valencia, Spain, Jan. 18-22, 2010.
International Application PCT/IB2010/051088 Search Report dated Sep. 21, 2010.
International Application PCT/IB2010/053272 Search report dated Dec. 27, 2010.
Motorola, "Codebook for 8Tx DL SU-MIMO for LTE-1", TSG-RAN WG1 #59, Jeju, Korea, Nov. 9-13, 2009.
Marvell Semiconductor, "Precoding Options for 8Tx Antennas in LTE-A DL", 3GPP TSG RAN WG1 Meeting #55bis, Ljubljana, Slovenia, Jan. 12-16, 2009.
U.S. Appl. No. 13/052,075, filed Mar. 20, 2011.
Marvell, "Codebook Adaptation for ULA Antenna", 3GPP TSG RAN WG1 Meeting #60, San Francisco, USA, Feb. 22-22, 2010.

(56) References Cited

OTHER PUBLICATIONS

U.S. Appl. No. 61/321,386, filed Apr. 6, 2010.
U.S. Appl. No. 61/294,737, filed Mar. 13, 2010.
U.S. Appl. No. 12/902,168, filed Oct. 12, 2010.
U.S. Appl. No. 12/903,237, filed Oct. 13, 2010.
Alcatel-Lucent, "Fractional Power Control Using Pilot Power Ration Measurements for the E-UTRA Uplink", 3GPP TSG RAN WG1 # 48, St. Louis, USA, Feb. 12-16, 2007.
Alcatel-Lucent Shanghai Bell, "Considerations on spatial covariance aided implicit feedback for MU-MIMO", 3GPP TSG RAN WG1 Meeting #59, Jeju, Korea, Nov. 9-13, 2009.
Catt, "Feedback enhancements for LTE-A downlink transmission", 3GPP TSG RAN WG1 Meeting #59, Jeju, Korea, Nov. 9-13, 2009.
Marvell, "Details of Pucch 1-1 for 8Tx", 3GPP TSG RAN # 63, Jacksonville, USA, Nov. 15-19, 2010.
U.S. Appl. No. 13/433,293, filed Mar. 29, 2012.
Ericsson et al., "Way Forward for Rel-10 Feedback Framework", 3GPP TSG RAN WG1 Meeting #60, San Francisco, USA, Feb. 22-22, 2010.
Huawei, "Adaptive Feedback: A New Perspective of the Adaptive Codebook", 3GPP TSG RAN WG1 meeting #58, Shenzhen, China, Aug. 24-28, 2009.
Motorola, "Interference Mitigation via Power Control and FSM Resource Allocation and UE Alignment for E-UTRA Uplink and TP", 3GPPP TSG RAN1 # 44, Denver, USA, Feb. 13-17, 2006.
Marvell, "Successive Codebook Refinement: Further details and evaluation", 3GPP TSG-RAN WG1 #60bis, Beijing, Apr. 12-16, 2010.
Marvell Semiconductor, "Feedback Methods for Exploiting Channel Correlation in LTE-A DL", 3GPP TSG RAN WG1 Meeting #57, Los Angeles, USA, Jun. 29-Jul. 3, 2009.
Marvell Semiconductor, "Spatial Correlation based transmission schemes for LTE-A DL", 3GPP TSG RAN WG1 meeting #58, Shenzhen, China, Aug. 24-28, 2009.
Samsung, "Comparisons and performance evaluation of differential feedback proposals for Rel 8 PMI enhancements", 3GPP TSG RAN WG1 Meeting #59bis, Valencia, Spain, Jan. 18-22, 2010.
Samsung, "Codebook Design for 8 Tx Transmission in LTE-A", 3GPP TSG RAN WG1 Meeting #56, Athens, Greece, Feb. 9-13, 2009.
International Application PCT/IB2009/052987 Search Report dated Jan. 27, 2010.
Rapporteur (NTT Docomo), "Text Proposal for RAN1 TR on LTE Advanced", 3GPP TSG RAN WG1 Meeting #53bis, Warsaw, Poland, Jun. 30-Jul. 4, 2008.
Ericsson, "Design and Evaluation of Precoder Codebooks for CSI Feedback", 3GPP TSG RAN WG1 61bis, Dresden, Germany, Jun. 28-Jul. 2, 2010.
Samsung, "Coordinated Multi-Point Operation for LTE", TSG RAN WG1 50, Istanbul, Turkey, Dec. 7-10, 2010.
Alcatel-Lucent et al., "Way Forward on CSI Feedback for Rel.10 DL MIMO", 3GPP TSG RAN WG1 62, Madrid, Spain, Aug. 23-27, 2010.
Alcatel-Lucent et al., "Further Analysis of Companion Feedback Performance and Feedback Signaling Overhead Reduction", 3GPP TSG RAN WG1 62, Madrid, Spain, Aug. 23-27, 2010.
Alcatel-Lucent et al., "Way Forward on CQI/PMI Reporting Enhancement on Pusch 3-1 for 2, 4 and 8 TX", 3GPP TSG RAN WG1 62bis, Xian, China, Oct. 11-15, 2010.
Marvell, "CQI Enhancement for 4Tx", 3GPP TSG-RAN WG1 #62bis, Xian, Oct. 11-15, 2010.
NEC Group, "Enhancing MU-MIMO CQI," 3GPP TSG-RAN WG1 #62bis, Xian, China, Oct. 11-15, 2010.
LG Electronics, "Further Discussion on CQI/PMI Enhancement", 3GPP TSG RAN # 62BIS, Xian, China, Oct. 11-15, 2010.
Marvell, "Two-Component PMI Codebook for 8TX", 3GPP TSG RAN # 62 Meeting, Madrid, Spain, Aug. 23-27, 2010.
Alcatel-Lucent et al., "Way Forward on Enhancement for Re1.10 DL MIMO", 3GPP TSG RAN WG1 62, Madrid, Spain, Aug. 23-27, 2010.
Samsung, "Preliminary CoMP JP Results for Homogeneous Networks", 3GPP TSG RAN # 64, Taipei, Taiwan, Feb. 21-25, 2011.
Huawei, "Performance Evaluation of Phase 1: Downlink Homogeneous Network with High Tx Power RRHs", 3GPP TSG RAN # 64, Taipei, Taiwan, Feb. 21-25, 2011.
ZTE, "Initial CoMP Evaluation for Homogeneous Network with High Tx Power RRHs", 3GPP TSG RAN # 64, Taipei, Taiwan, Feb. 21-25, 2011.
U.S. Appl. No. 12/723,647 Official Action dated Feb. 6, 2012.
U.S. Appl. No. 12/723,647 Official Action dated Apr. 27, 2012.
U.S. Appl. No. 12/652,044 Official Action dated Feb. 7, 2012.
Alcatel-Lucent et al., "Way Forward on 8Tx Codebook for Re1.10 DL MIMO", 3GPP TSG RAN WG1 62, Madrid, Spain, Aug. 23-27, 2010.
Japanese Patent Application # 2011-544111 Office Action dated Mar. 12, 2013.
U.S. Appl. No. 13/252,218 Office Action dated Apr. 11, 2013.
ZTE, "Link Analysis of 4Tx Codebook Design for DL SU-MIMO", 3GPP TSG-RAN WG1 #48bis, St. Julians, Malta, Mar. 26-30, 2007.
Asahi, H., "A Function Generator for Walsh Order Hadamard Matrix and Fast Walsh-Hadamard Transform", Geoinformatics, vol. 11, No. 1, pp. 3-9, year 2000.
U.S. Appl. No. 12/253,078 Office Action dated May 23, 2013.
U.S. Appl. No. 13/672,727 Office Action dated Sep. 19, 2014.
European Application # 12765629 Search Report dated Aug. 5, 2014.
U.S. Appl. No. 13/610,904 Office Action dated Oct. 7, 2014.
Huang et al., "A Limited Feedback Precoding System with Hierarchical Codebook and Linear Receiver", IEEE Transactions on Wireless Communications, vol. 7, No. 12, pp. 4843-4848, Dec. 2008.
Kim et al., "Efficient Feedback via Subs pace-Based Channel Quantization for Distributed Cooperative Antenna Systems with Temporarily Correlated Channels", EURASIP Journal on Advances in Signal Processing, vol. 2008, Nov. 23, 2007.
NTT Docomo, "Views on Codebook Design for Downlink 8Tx MIMO", 3GPP TSG RAN WG1 Meeting #59bis, Valencia, Spain, Jan. 18-22, 2010.
Alcatel Lucent, "Overview of Hierarchical Codebook Approach", 3GPP TSG RAN WG1 Meeting #59bis, Valencia, Spain, Jan. 18-22, 2009.
JP Patent Application # 2011-024295 Official Action dated Sep. 11, 2012.
Samsung, "Precoding for polarized 4Tx configurations", 3GPP TSG RAN WG1 Meeting #48bis, St Julian's, Malta, Mar. 26-30, 2007.
Mondal et al., "Rank-Independent Codebook Design from a Quaternary Alphabet", Proceedings of 41st Asilomar Conference on Signals, Systems and Computers (ACSSC), pp. 297-301, Nov. 7, 2007.
JP Patent Application # 2011-544111 Official Action dated Nov. 6, 2012.
U.S. Appl. No. 12/965,878 Office Action dated Oct. 24, 2013.
U.S. Appl. No. 13/052,075 Notice of Allowance dated Nov. 8, 2013.
U.S. Appl. No. 12/965,878 Official Action dated Apr. 1, 2013.
U.S. Appl. No. 13/023,555 Office Action dated Feb. 5, 2013.
International Application PCT/IB2012/056181 Search Report dated Mar. 4, 2013.
International Application PCT/IB2012/056289 Search Report dated Mar. 26, 2013.
International Application PCT/IB2012/056182 Search Report dated Feb. 26, 2013.
Japanese Patent Application # 2011024295 Office Action dated Jan. 15, 2013.
U.S. Appl. No. 13/669,476 Office Action dated Mar. 31, 2014.
U.S. Appl. No. 14/179,593 Office Action dated Apr. 9, 2014.
U.S. Appl. No. 12/903,237 Office Action dated Feb. 27, 2014.
JP Application # 2012537460 Office Action dated Jan. 21, 2014.
NTT Docomo, 3GPP TSG RAN WG1, "Views on Scalable CSI Feedback for DL CoMP in LTE-Advanced", Meeting #58bis, R1-094243, pp. 1-5, Oct. 12-16, 2009.

(56) References Cited

OTHER PUBLICATIONS

NTT Docomo, 3GPP TSG RAN WG1, "Views on Single-Cell CSI Feedback Enhancement for DL MU-MIMO in LTE-Advanced", Meeting #58bis, R1-094241, pp. 1-6, Oct. 12-16, 2009.
U.S. Appl. No. 13/669,477 Official Action dated Apr. 14, 2014.
U.S. Appl. No. 12/965,878 Notice of Allowance dated Feb. 10, 2014.
U.S. Appl. No. 13/543,835 Office Action dated Nov. 22, 2013.
JP Patent Application # 2011-551560 Office Action dated Oct. 29, 2013.
JP Patent Application # 2012-506601 Office Action dated Oct. 22, 2013.
U.S. Appl. No. 13/610,904 Office Action dated Mar. 4, 2015.
U.S. Appl. No. 13/862,422 Office Action dated Feb. 12, 2015.

\* cited by examiner

FEEDBACK FOR COOPERATIVE MULTIPOINT TRANSMISSION SYSTEMS

CROSS-REFERENCE TO RELATED APPLICATIONS

This application claims the benefit of U.S. Provisional Patent Application 61/432,980, filed Jan. 14, 2011, and U.S. Provisional Patent Application 61/559,896, filed Nov. 15, 2011, whose disclosures are incorporated herein by reference.

FIELD OF THE DISCLOSURE

The present invention relates generally to wireless communication, and particularly to methods and systems for channel feedback in wireless communication systems.

BACKGROUND

Some Multiple-Input Multiple-Output (MIMO) communication systems use Coordinated Multipoint (CoMP) schemes, in which multiple base stations coordinate beamforming and scheduling of transmissions with one another. Coordinated transmission of this sort is used, for example, in Evolved Universal Terrestrial Radio Access (E-UTRA) systems, also referred to as Long-Term Evolution (LTE), which are specified by the Third Generation Partnership Project (3GPP).

CoMP schemes for LTE are described, for example, in document RP-101425 of the 3GPP Technical Specification Group (TSG) Radio Access Network (RAN), entitled "Coordinated Multi-Point Operation for LTE," December, 2010; and in 3GPP TSG RAN document R1-094906, entitled "Downlink MIMO with Coordinated Beamforming and Scheduling," November, 2009, which are incorporated herein by reference.

The description above is presented as a general overview of related art in this field and should not be construed as an admission that any of the information it contains constitutes prior art against the present patent application.

SUMMARY

An embodiment that is described herein provides a method in a mobile communication terminal. The method includes receiving signals from a serving cell and from one or more interfering cells. Respective channel responses are estimated in the terminal for the signals received from the interfering cells. A level of interference, caused by the signals of the interfering cells to a signal received from the serving cell, is derived from the channel responses. A Signal to Noise Ratio (SNR) is calculated for the signal received from the serving cell based on the level of interference caused by the signals of the interfering cells. Feedback information is produced based on the SNR and transmitted from the terminal.

In some embodiments, producing the feedback information includes computing in the terminal respective preferred precoding vectors for the serving cell and for the interfering cells, and transmitting the feedback information includes reporting the preferred precoding vectors together with the SNR. In a disclosed embodiment, deriving the level of interference includes computing in the terminal the level of interference based on the channel responses under an assumption that the signals of the interfering cells are precoded with precoding vectors which are distributed isotropically in a signal space that is orthogonal to a preferred precoding vector requested by the terminal from the serving cell.

In another embodiment, deriving the level of interference includes computing in the terminal the level of interference based on the channel responses under an assumption that the signals of the interfering cells are precoded with precoding vectors that are distributed isotropically. In yet another embodiment, deriving the level of interference includes computing in the terminal the level of interference based on the channel responses under an assumption that the signals of the interfering cells are precoded with precoding vectors constrained to a signal space that is orthogonal to a preferred precoding vector requested by the terminal from the serving cell.

In still another embodiment, deriving the level of interference includes computing in the terminal the level of interference based on the channel responses under an assumption that the signals of the interfering cells are precoded with precoding vectors which are constrained to a signal space that is orthogonal to preferred precoding vectors computed by the terminal for the interfering cells. In a disclosed embodiment, deriving the level of interference includes computing in the terminal the level of interference based on the channel responses under an assumption that the interfering cells apply a coordinated beamforming scheme to attenuate the signals of the interfering cells in a direction of the terminal.

In some embodiments, calculating the SNR includes estimating in the terminal a covariance of noise and interference from sources other than the one or more interfering cells, and computing the SNR based on a sum of the covariance and the level of interference. In an embodiment, the serving cell and the interfering cells are collocated in a single base station.

There is additionally provided, in accordance with an embodiment that is described herein, apparatus including a receiver, processing circuitry and a transmitter. The receiver is configured to receive signals from a serving cell and from one or more interfering cells. The processing circuitry is configured to estimate respective channel responses for the signals received from the interfering cells, to derive from the channel responses for the signals of the interfering cells a level of interference caused by the signals of the interfering cells to the signal received from the serving cell, to calculate a Signal to Noise Ratio (SNR) for the signal received from the serving cell based on the level of interference caused by the signals of the interfering cells, and to produce feedback information based on the SNR. The transmitter is configured to transmit the feedback information.

In an embodiment, a mobile communication terminal includes the disclosed apparatus. In an embodiment, a chipset for processing signals in a mobile communication terminal includes the disclosed apparatus.

The present disclosure will be more fully understood from the following detailed description of the embodiments thereof, taken together with the drawings in which:

DETAILED DESCRIPTION OF EMBODIMENTS

Embodiments that are described herein offer improved methods and systems for providing channel feedback in cellular communication systems. The base stations or cells in the system are assumed to employ CoMP, i.e., coordinate their downlink transmissions to mobile communication terminals.

In the disclosed embodiments, a mobile communication terminal receives downlink signals from its serving cell, as well as interfering signals from one or more interfering cells. The terminal calculates feedback information relating to the Signal to Noise Ratio (SNR) of the serving cell and to the responses of the communication channels of the serving cell and the interfering cells. The terminal transmits the feedback information on an uplink channel, and the various cells use this feedback information for configuring subsequent downlink transmissions.

In some embodiments, the terminal estimates the level of interference caused by the interfering cells, and calculates the SNR of the serving cell signal based on this estimate. In various embodiments, the terminal estimates the level of interference under different assumptions regarding the coordination among the cells. One example assumption is that the interfering cells precode their signals with precoding vectors that are distributed isotropically in a signal space that is orthogonal to a preferred precoding vector requested by the terminal from the serving cell. Other examples of assumptions regarding inter-cell coordination are described herein.

The feedback schemes described herein report an SNR in which the estimated level of interference takes into account the mode of cooperation between the cells in the system. This sort of feedback information enables the cooperating cells to improve the configuration of subsequent downlink transmissions, e.g., make better beamforming and scheduling decisions. As a result, by using example techniques disclosed herein, interference in the system can be reduced and system throughput can be increased.

Figure 1:
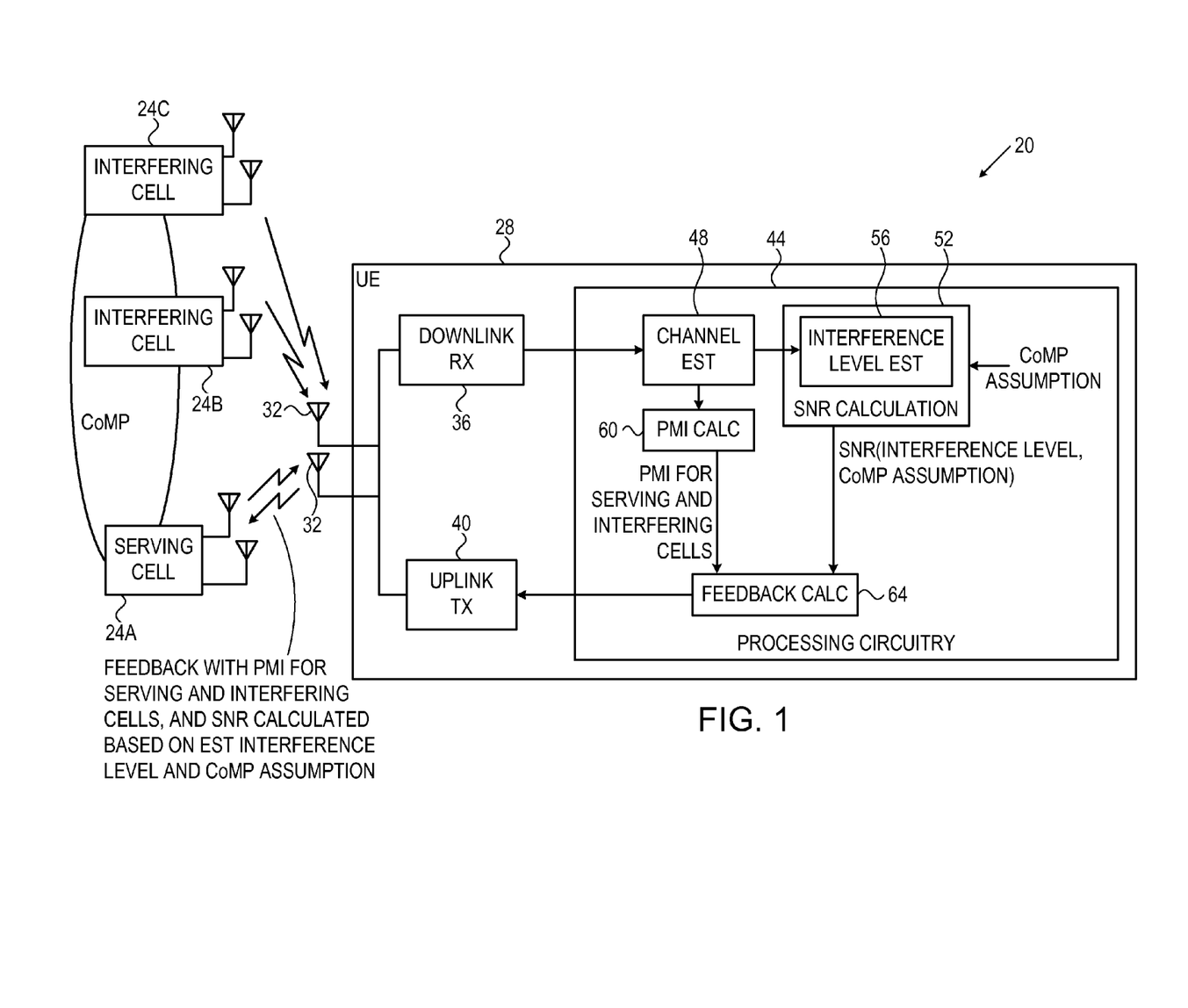
FIG. 1 is a block diagram that schematically illustrates a Cooperative Multipoint (CoMP) communication system, in accordance with an embodiment that is described herein.

FIG. 1 is a block diagram that schematically illustrates a Cooperative Multipoint (CoMP) communication system 20, in accordance with an embodiment that is described herein. In the present example, system 20 comprises a cellular system that operates in accordance with the LTE specifications. In alternative embodiments, system 20 may operate in accordance with any other suitable communication standard or protocol that involves cooperation between cells, such as, for example, Wireless Local Area Network (WLAN) protocols.

System 20 comprises base stations, referred to as cells, which communicate with mobile communication terminals. FIG. 1 shows three cells 24A . . . 24C (also referred to as eNodeB) and a single terminal 28 (also referred to as User Equipment—UE). This choice is made, however, purely by way of example. In real-life configurations, system 20 typically comprises a large number of cells and a large number of terminals. A given terminal may be subject to interference caused by signals transmitted from any suitable number of interfering cells. Terminal 28 may comprise, for example, a cellular phone, a wireless-enabled computing device or any other suitable type of communication terminal.

In the present example, cell 24A is the serving cell of terminal 28, i.e., the cell via which terminal 28 conduct communication sessions in system 20. Cells 24B and 24C, which do not currently serve terminal 28, are regarded as interfering cells from the terminal's perspective. In some embodiments, the serving cell and interfering cells are collocated at a single site, for example at a single base station tower. In alternative embodiments, however, the serving cell and interfering cells may be located at different sites. The disclosed techniques do not mandate any particular geographical relation between the different cells.

The cells in system 20 employ CoMP, i.e., cells 24A . . . 24C coordinate downlink transmissions with one another. In the description that follows, cells 24A . . . 24C use cooperative beamforming (CoBF), i.e., coordinate the precoding and scheduling of downlink transmissions in order to reduce interference. The disclosed techniques, however, are applicable to other types of CoMP, for example to Joint Processing (JP) in which multiple cells transmit simultaneously to a given terminal.

In some embodiments, terminal 28 calculates feedback information based on the signals it receives from the serving cell and from the interfering cells. The feedback information comprises, for example, preferred precoding vectors (e.g., Precoding Matrix Indicators—PMI) for receiving subsequent transmissions from the serving cell and the interfering cells, and a Signal to Noise Ratio (SNR) estimated for the serving cell signal. In some embodiments that are described in detail below, terminal 28 estimates the serving cell SNR in a manner that takes into account the form of cooperation among the cells, e.g., the way in which the interfering cells precode the downlink signals they transmit.

In the embodiment of FIG. 1, terminal 28 comprises one or more antennas 32, a downlink receiver (RX) 36, an uplink transmitter (TX) 40 and processing circuitry 44. Antennas 32 receive downlink Radio Frequency (RF) signals from the cells and transmit uplink RF signals to the cells. Downlink receiver 36 receives the downlink RF signals from antennas 32, down-converts them to baseband and digitizes the baseband signals, in an embodiment. Uplink transmitter 40 produces uplink RF signals that carry uplink data and transmits the uplink RF signals via antennas 32.

Processing circuitry 44 carries out the various processing functions of terminal 28, e.g., calculation of feedback information. In the present example, circuitry 44 comprises a channel estimation unit that estimates the responses of the communication channels between the cells (serving cell and interfering cells) and the terminal. An SNR calculation unit 52 calculates the SNR of the serving cell signal. Unit 52 comprises an interference level estimation module 56, which estimates the level of interference caused by the interfering cells, under certain assumptions on the mode of cooperation between the cells. A PMI calculation unit 60 calculates preferred precoding vectors for the serving cell and for the interfering cells.

In an embodiment, a feedback calculation unit 64 calculates, based on the outputs of SNR calculation unit 52 and PMI calculation 60, feedback information regarding the communication channels between the (serving and interfering) cells and the terminal. In the present example, the feedback information comprises a PMI for the serving cell, a respective PMI for each of the interfering cells, and an SNR for the serving cell signal. Unit 64 provides the feedback information to uplink transmitter 40, for transmission on the uplink.

The terminal configuration shown in FIG. 1 is an example configuration, which is depicted in a highly simplified manner solely for the sake of clarity. In alternative embodiments, any other suitable terminal configuration can be used. Terminal elements that are not mandatory for understanding of the disclosed techniques have been omitted from the figure for the sake of clarity and to avoid obfuscating the teaching qualities of this description.

In various embodiments, some or all of the elements of terminal 28, including receiver 36, transmitter 40 and processing circuitry 44, are implemented in hardware, such as for example using one or more Radio Frequency Integrated Circuits (RFICs), Field-Programmable Gate Arrays (FPGAs) or Application-Specific Integrated Circuits (ASICs). In alternative embodiments, certain elements of terminal 28 are implemented in software, or using a combination of hardware, firmware and/or software elements. In some embodiments, certain terminal elements, such as certain elements of circuitry 44, are implemented in a programmable processor, which is programmed in software to carry out the functions described herein. The software may be downloaded, in whole or in part, to the processor in electronic form, over a network, for example, or it may, alternatively or additionally, be provided and/or stored on non-transitory tangible media, such as magnetic, optical, or electronic memory.

In a typical flow, processing circuitry 44 of each terminal 28 in system 20 identifies the two (or other predefined number) strongest cells other than the serving cell. The serving cell and the strongest other cells are referred to collectively as the reporting set of the terminal. In an embodiment, the terminal is configured by the serving cell to include in the reporting set all the cells that are collocated with the serving cell. The terminal typically identifies the reporting set based on Radio Resource Management (RRM) measurements, which measure Reference Signal Received Power (PSRP) or Reference Signal Receive Quality (PSRQ).

Channel estimation unit 48 in the terminal estimates the response of the communication channels between each cell in the reporting set and the terminal, e.g., based on Channel State Information Reference Signals (CSI-RS). Unit 48 also estimates the long-term covariance of the noise and the interference from cells outside the reporting set.

The serving cell typically configures the terminal to send feedback information relating to a subset of the reporting set, referred to as the cooperating set. In intra-site CoMP scenarios, i.e., when all the cells in the reporting set are collocated, the cooperating set is identical to the reporting set. Using this feedback information, the serving cell is able to predict the channel conditions during subsequent downlink transmission (e.g., Physical Downlink Shared Channel—PDSCH) to the terminal, and, for example, configure the subsequent downlink transmission accordingly.

The downlink signal received in terminal 28 can be written as:

$$Y = H_0 x_0 + H_1 x_1 + H_2 x_2 + v \quad \text{Equation 1:}$$

wherein $H_0$ denotes the estimated channel response between the serving cell and the terminal, $H_1$ and $H_2$ denote the estimated channel responses between the remaining cells in the reporting set (i.e., the interfering cells) and the terminal, and v denotes noise and interference vector as estimated by the terminal. The estimated covariance of v is denoted $K_v$.

As noted above, SNR calculation unit 52 calculates the SNR of the serving cell signal in a manner that takes into account the form of cooperation (denoted "CoMP assumption" in the figure) between the cells in the system. Typically, interference level estimation unit 56 estimates the level of interference based on the CoMP assumption, and then unit 52 calculates the SNR based on the estimated level of interference. Several examples of assumptions regarding the cooperation between cells ("CoMP assumptions") are given below, together with the corresponding SNR calculation formulas.

In some embodiments, an assumption is made that the interfering cells in the reporting set will avoid transmissions in directions that cause interference to the reception of the serving cell. Under this assumption, the interference from the interfering cells in the reporting set is assumed to be zero. The estimated SNR for each time-frequency resource is therefore a function of the serving cell channel response, the preferred precoding vector (PMI) requested by the terminal, and the covariance of noise outside the reporting set. This SNR estimate can be written as:

$$SNR(v_0) = f(v_0, H_0, K_v) \quad \text{Equation 2:}$$

wherein $v_0$ denotes the preferred precoding vector requested by the terminal, and the specific function $f(\bullet)$ depends on the type of receiver used (e.g., Maximum Ratio Combining—MRC, or Minimum Mean Square Error—MMSE).

In an alternative embodiment, an assumption is made that the precoding vectors used by the interfering cells in the reporting set are distributed isotropically, i.e., the interfering cells in the reporting set transmit in all directions with equal probability. The SNR under this assumption is given by:

$$SNR(v_0) = f\left(v_0, H_0, K_v + \frac{1}{N_T}[H_1 H_1^* + H_2 H_2^*]\right) \quad \text{Equation 3}$$

wherein $N_T$ denotes the number of transmit antennas in each cell. In this example, the term $$\frac{1}{N_T}[H_1 H_1^* + H_2 H_2^*]$$

quantifies the level of interference from the interfering cells in the reporting set. Typically, module 56 calculates this term based on the channel responses $H_1$ and $H_2$, and unit 52 then calculates the SNR estimate.

In yet another embodiment, an assumption is made that the interfering cells in the reporting set will schedule their transmissions in a manner that eliminates interference in the direction of $v_0$. Interference from cells in the reporting set that is orthogonal to $v_0$ is assumed to be isotropic. In other words, the assumption is that the precoding vectors used by the interfering cells in the reporting set are all constrained to a signal space that is orthogonal to the precoding vector (PMI) $v_0$ requested by the terminal for the serving cell.

The SNR under this assumption can be written as:

$$SNR(v_0) = f\bigg(v_0, H_0, K_v + \\ \frac{1}{N_T - 1}[H_1(I - v_0 v_0^*)H_1^* + H_2(I - v_0 v_0^*)H_2^*]\bigg) \quad \text{Equation 4}$$

wherein I denotes an identity matrix. The interference from the cells in the reporting set is calculated by module 56 and can be approximated by:

$$K_{reportingcells} = \frac{1}{N_T - 1}(H_1(I - v_0 v_0^*)H_1^* + H_2(I - v_0 v_0^*)H_2^*) \quad \text{Equation 5}$$

Note that in the example above, the transmit power is considered within the actual channel. For higher rank transmissions, the interference can be written as:

$$K_{reportingcells} = \\ \frac{1}{N_T - \text{rank}}(H_1(I - U(v_0 v_0^*))H_1^* + H_2(I - U(v_0 v_0^*))H_2^*) \quad \text{Equation 6}$$

wherein U(A) denotes a matrix that orthonormalizes the column of matrix A.

In an alternative embodiment, the interfering cells in the reporting set avoid precoding vectors that are directed along the precoding vectors from the interfering cells to the terminal—$v_1$ and $v_2$. The terminal may still be subject to interference in directions that are orthogonal to $v_1$ and $v_2$. The SNR estimate in this embodiment is given by:

$$SNR(v_0) = f\left(v_0, H_0, K_v + \frac{1}{N_T - 1}[H_1(I - v_1 v_1^*)H_1^* + H_2(I - v_2 v_2^*)H_2^*]\right) \quad \text{Equation 7}$$

In other words, the assumption in this embodiment is that the precoding vectors used by the interfering cells in the reporting set are all constrained to a signal space that is orthogonal to the precoding vectors computed by the terminal for the interfering cells. For a general set S of cooperating cells, Equation 7 can be generalized to give:

$$SNR(v_0) = f\left(v_0, H_0, K_v + \sum_{i \in S} \frac{1}{N_i - 1}[H_i(I - v_i v_i^*)H_i^*]\right) \quad \text{Equation 8}$$

wherein $N_i$ denotes the number of antennas in the $i^{th}$ cell, $H_1$ denotes the channel response between the $i^{th}$ cell and the terminal, and $v_i$ denotes the precoding vector from the $i^{th}$ cell to the terminal.

The above-described CoMP assumptions and corresponding SNR estimates are given purely by way of example. In alternative embodiments, SNR calculation unit 52 may estimate the SNR of the serving cell signal in any other suitable way and under any other suitable assumption regarding the cooperation between cells.

In some embodiments, PMI calculation unit 60 calculates preferred precoding vectors (PMIs) for the serving cell and for the interfering cells in the reporting set. In an example embodiment, the serving cell PMI that maximizes the SNR is computed for each spectral sub-band, and the corresponding SNR value is quantized into a four-bit Modulation and Coding Scheme (MCS) value denoted $mcs_0$.

For the other cells in the reporting set (i.e., for the interfering cells), only PMI (or Channel Direction Indication—CDI) is fed back, and the channel magnitude information is typically not provided. Unit 60 typically calculates the PMI or CDI by quantizing the principal eigenvector of the transmit covariance matrix according to:

$$v_1 = q(\text{eig}(H_1^* H_1)), v_2 = q(\text{eig}(H_2^* H_2)) \quad \text{Equation 9:}$$

The SNR estimate calculated by unit 52 and the PMIs or CDIs for the serving cell and the interfering cells are provided to feedback calculation unit 64. The feedback calculation unit produces feedback information from the SNR estimate and PMIs/CDIs, and provides the feedback information to uplink transmitter 40 for transmission to the serving cell.

In an embodiment, the feedback information that is reported to the serving cell comprises $mcs_0$, $v_0$, $v_1$ and $v_2$, as defined above. For a LTE Release 8 4Tx codebook, for example, the feedback size is sixteen bits. In alternative embodiments, unit 64 may format the feedback information in any other suitable way.

In various embodiments, the cooperating cells in system 20 configure subsequent downlink transmissions to the terminals in any suitable way based on the feedback information. In one embodiment, for each potential group of terminals, the cells determine the appropriate precoding vectors based on regularized zero-forcing. For the SNR estimate of FIG. 2, for example, the serving cell may down-scale the MCS requested by the terminal in order to compensate for the change in precoding direction. The cells then schedule the optimal group, which maximizes the cluster throughput. As another example, for the SNR estimate of Equation 3, since interference is already accounted for, the cells may perform independent scheduling at each cell. The cells then compute the precoding vectors for the group of winning terminals.

Figure 2:
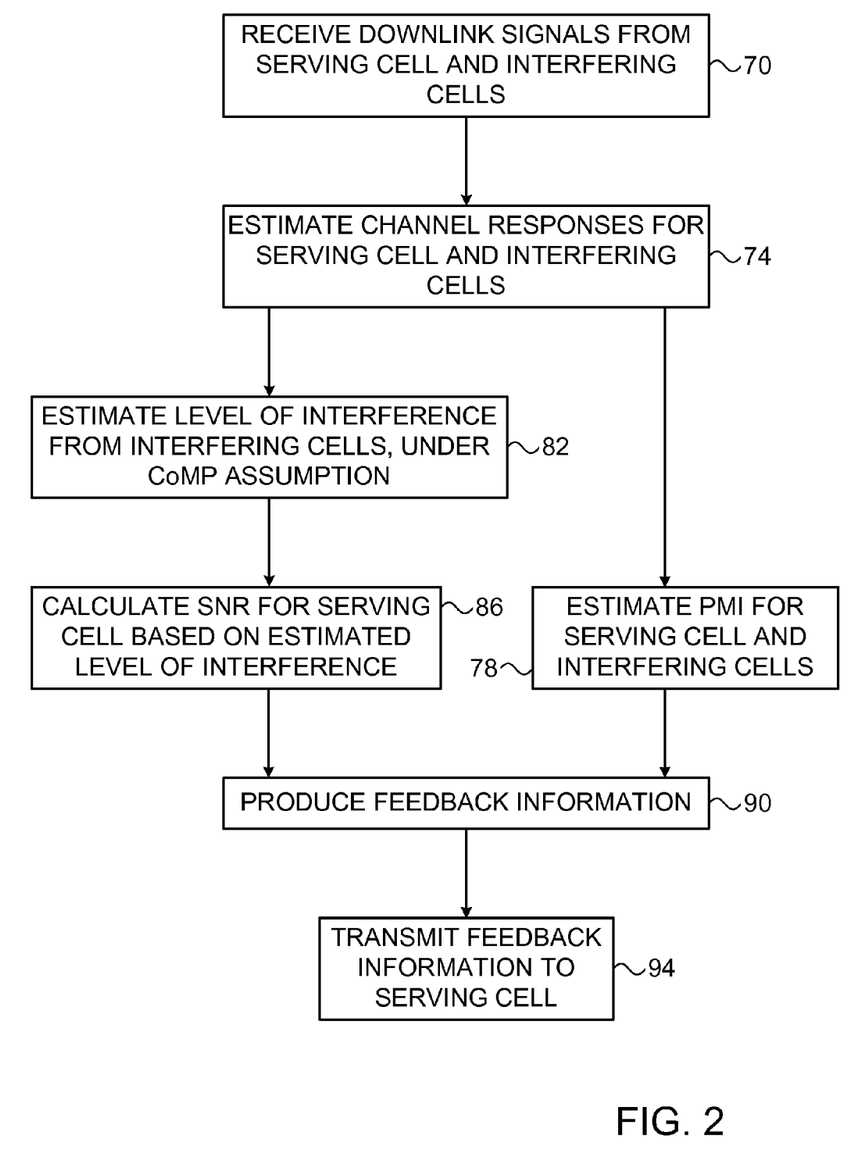
FIG. 2 is a flow chart that schematically illustrates a method for channel feedback in a CoMP system, in accordance with an embodiment that is described herein.

FIG. 2 is a flow chart that schematically illustrates a method for channel feedback in a CoMP system, in accordance with an embodiment that is described herein. The method begins with terminal 28 receiving downlink signals from the serving cell and from the interfering cells, at a reception operation 70. Channel estimation unit 48 in processing circuitry 44 of the terminal estimates the channel responses from the (serving and interfering) cells to the terminal, at a channel estimation operation 74. The estimated channel responses are provided to PMI calculation unit 60 and to SNR calculation unit 52.

PMI calculation unit 60 estimates the PMIs (or CDIs) for the serving cell and the interfering cells, at a PMI estimation operation 78. SNR calculation unit 52 estimates the level of interference caused by the interfering cells, at an interference estimation operation 82. As explained above, the interference level estimate accounts for the interference from the interfering cells under a certain assumption on the CoMP scheme applied by the cells. SNR calculation unit 52 then calculates the SNR of the serving cell signal, based on the estimated interference level caused by the interfering cells, at an SNR estimation operation 86.

Feedback calculation unit 64 produces feedback information, at a feedback formatting operation 90. The feedback information comprises the estimated SNR for the serving cell signal, and the PMIs/CDIs for the serving cell and the interfering cells. Uplink transmitter 40 transmits the feedback information to the serving cell over the uplink, at a feedback transmission operation 90.

The cells configure subsequent downlink transmissions to the terminals based on the feedback information. Since the feedback information accounts for the actual cooperation scheme among the cells, the cells are able to configure the subsequent transmissions (e.g., make beamforming and scheduling decisions) with high accuracy in comparison with feedback schemes that do not account for inter-cell cooperation. As a result, system throughput can be increased and interference can be reduced. Example simulation results that demonstrate the performance gain of the disclosed technique are provided in U.S. Provisional Patent Application 61/432, 980, cited above.

Although the embodiments described herein mainly address cellular systems in which eNodeBs or other base stations coordinate transmissions with one another, the methods and systems described herein can also be used in other applications that involve cooperation between transmitters, such as in WLAN systems.

It is noted that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:

1. A method, comprising:
   receiving in a mobile communication terminal signals from a serving cell and from one or more interfering cells;
   estimating in the terminal respective channel responses for the signals received from the interfering cells, and deriving from the channel responses for the signals of the interfering cells a level of interference caused by the signals of the interfering cells to a signal received from the serving cell, under an assumption that the signals of the interfering cells are precoded with precoding vectors that are distributed isotropically;
   calculating a Signal to Noise Ratio (SNR) for the signal received from the serving cell based on the level of interference caused by the signals of the interfering cells; and
   producing feedback information based on the SNR, and transmitting the feedback information from the terminal.

2. The method according to claim 1, wherein producing the feedback information comprises computing in the terminal respective preferred precoding vectors for the serving cell and for the interfering cells, wherein transmitting the feedback information comprises reporting the preferred precoding vectors together with the SNR.

3. The method according to claim 1, wherein deriving the level of interference comprises computing in the terminal the level of interference based on the channel responses under an assumption that the signals of the interfering cells are precoded with precoding vectors which are distributed isotropically in a signal space that is orthogonal to a preferred precoding vector requested by the terminal from the serving cell.

4. A method, comprising:
   receiving in a mobile communication terminal signals from a serving cell and from one or more interfering cells;
   estimating in the terminal respective channel responses for the signals received from the interfering cells, and deriving from the channel responses for the signals of the interfering cells a level of interference caused by the signals of the interfering cells to a signal received from the serving cell, under an assumption that the signals of the interfering cells are precoded with precoding vectors constrained to a signal space that is orthogonal to a preferred precoding vector requested by the terminal from the serving cell;
   calculating a Signal to Noise Ratio (SNR) for the signal received from the serving cell based on the level of interference caused by the signals of the interfering cells; and
   producing feedback information based on the SNR, and transmitting the feedback information from the terminal.

5. A method, comprising:
   receiving in a mobile communication terminal signals from a serving cell and from one or more interfering cells;
   estimating in the terminal respective channel responses for the signals received from the interfering cells, and deriving from the channel responses for the signals of the interfering cells a level of interference caused by the signals of the interfering cells to a signal received from the serving cell, under an assumption that the signals of the interfering cells are precoded with precoding vectors which are constrained to a signal space that is orthogonal to preferred precoding vectors computed by the terminal for the interfering cells;
   calculating a Signal to Noise Ratio (SNR) for the signal received from the serving cell based on the level of interference caused by the signals of the interfering cells; and
   producing feedback information based on the SNR, and transmitting the feedback information from the terminal.

6. The method according to claim 1, wherein deriving the level of interference comprises computing in the terminal the level of interference based on the channel responses under an assumption that the interfering cells apply a coordinated beamforming scheme to attenuate the signals of the interfering cells in a direction of the terminal.

7. The method according to claim 1, wherein calculating the SNR comprises estimating in the terminal a covariance of noise and interference from sources other than the one or more interfering cells, and computing the SNR based on a sum of the covariance and the level of interference.

8. The method according to claim 1, wherein the serving cell and the interfering cells are collocated in a single base station.

9. Apparatus, comprising:
   a receiver, which is configured to receive signals from a serving cell and from one or more interfering cells;
   processing circuitry, which is configured to estimate respective channel responses for the signals received from the interfering cells, to derive from the channel responses for the signals of the interfering cells a level of interference caused by the signals of the interfering cells to the signal received from the serving cell under an assumption that the signals of the interfering cells are precoded with precoding vectors that are distributed isotropically, to calculate a Signal to Noise Ratio (SNR) for the signal received from the serving cell based on the level of interference caused by the signals of the interfering cells, and to produce feedback information based on the SNR; and
   a transmitter, which is configured to transmit the feedback information.

10. The apparatus according to claim 9, wherein the processing circuitry is configured to compute respective preferred precoding vectors for the serving cell and for the interfering cells, wherein the transmitter is configured to transmit the preferred precoding vectors together with the SNR in the feedback information.

11. Apparatus, comprising:
   a receiver, which is configured to receive signals from a serving cell and from one or more interfering cells;
   processing circuitry, which is configured to estimate respective channel responses for the signals received from the interfering cells, to derive from the channel responses for the signals of the interfering cells a level of interference caused by the signals of the interfering cells to the signal received from the serving cell under an assumption that the signals of the interfering cells are precoded with precoding vectors constrained to a signal space that is orthogonal to a preferred precoding vector requested by the apparatus from the serving cell, to calculate a Signal to Noise Ratio (SNR) for the signal received from the serving cell based on the level of interference caused by the signals of the interfering cells, and to produce feedback information based on the SNR; and a transmitter, which is configured to transmit the feedback information.

12. Apparatus, comprising:

a receiver, which is configured to receive signals from a serving cell and from one or more interfering cells;

processing circuitry, which is configured to estimate respective channel responses for the signals received from the interfering cells, to derive from the channel responses for the signals of the interfering cells a level of interference caused by the signals of the interfering cells to the signal received from the serving cell under an assumption that the signals of the interfering cells are precoded with precoding vectors which are constrained to a signal space that is orthogonal to preferred precoding vectors computed by the processing circuitry for the interfering cells, to calculate a Signal to Noise Ratio (SNR) for the signal received from the serving cell based on the level of interference caused by the signals of the interfering cells, and to produce feedback information based on the SNR; and a transmitter, which is configured to transmit the feedback information.

13. The apparatus according to claim 9, wherein the processing circuitry is configured to compute the level of interference based on the channel responses under an assumption that the interfering cells apply a coordinated beamforming scheme to attenuate the signals of the interfering cells in a direction of the apparatus.

14. The apparatus according to claim 9, wherein the processing circuitry is configured to estimate a covariance of noise and interference from sources other than the one or more interfering cells, and to compute the SNR based on a sum of the covariance and the level of interference.

15. The apparatus according to claim 9, wherein the serving cell and the interfering cells are collocated in a single base station.

16. A mobile communication terminal comprising the apparatus of claim 9.

17. A chipset for processing signals in a mobile communication terminal, comprising the apparatus of claim 9.

* * * * *